United States Patent [19]
Bett et al.

[11] Patent Number: 6,080,806
[45] Date of Patent: Jun. 27, 2000

[54] WATER-REDISPERSIBLE POWDERS OF FILM-FORMING POLYMERS PREPARED FROM ETHYLENICALLY UNSATURATED MONOMERS

[75] Inventors: William Bett, Paris; Jean-Francois Colombet, Rueil-Malmaison, both of France

[73] Assignee: Rhodia Chimie, Courbevoie Cedex, France

[21] Appl. No.: 09/101,474

[22] PCT Filed: Jan. 8, 1997

[86] PCT No.: PCT/FR97/00030

§ 371 Date: Oct. 6, 1998

§ 102(e) Date: Oct. 6, 1998

[87] PCT Pub. No.: WO97/25371

PCT Pub. Date: Jul. 17, 1997

[30] Foreign Application Priority Data

Jan. 10, 1996 [FR] France .................................. 96 00188

[51] Int. Cl.$^7$ ....................................................... C08K 5/17
[52] U.S. Cl. ............................................. 524/219; 525/183
[58] Field of Search .............................. 524/219; 525/183

[56] References Cited

FOREIGN PATENT DOCUMENTS

| 0 078 449 | 5/1983 | European Pat. Off. . |
| 0 294 126 | 12/1988 | European Pat. Off. . |
| 0 544 377 | 6/1993 | European Pat. Off. . |
| 1 570 766 | 6/1969 | France . |
| 2 264 003 | 10/1975 | France . |
| 2 336 440 | 7/1977 | France . |
| 2 348 242 | 11/1997 | France . |

*Primary Examiner*—Nathan M. Nutter
*Attorney, Agent, or Firm*—Burns, Doane, Swecker & Mathis, L.L.P.

[57] ABSTRACT

A water-redispersible powder composition comprising (a) 100 parts by weight of a powder consisting of a water-insoluble film-forming polymer prepared from at least one ethylenically unsaturated monomer and at least one monomer selected from monomers having a carboxylic function and acrylamide or methacrylamide, and (b) 2–40 parts by weight and preferably 8–22 parts by weight of at least one amino acid or a salt thereof. A method for preparing said composition and the use thereof are also disclosed.

22 Claims, No Drawings

WATER-REDISPERSIBLE POWDERS OF FILM-FORMING POLYMERS PREPARED FROM ETHYLENICALLY UNSATURATED MONOMERS

CROSS-REFERENCE TO RELATED APPLICATIONS

This application claims the benefit of international application PCT/FR97/00030 filed Jan. 8, 1997, and French application FR96/00188 filed Jan. 10, 1996.

BACKGROUND OF THE INVENTION

1. Field of the Invention

The present invention relates to water-redispersible powders of film-forming polymers prepared from monomers containing ethylenic unsaturation.

2. Description of Related Art

Redispersible powders which are obtained by spray-drying of dispersions of acrylic film-forming polymers, especially of dispersions of vinyl ester polymers, are already known.

Film-forming polymers prepared from monomers containing ethylenic unsaturation are often employed as adjuvants in hydraulic inorganic binder compositions in order to improve their application and the properties after hardening, such as adhesion to various substrates, leakproofing, flexibility and mechanical properties.

When compared with aqueous dispersions, redispersbile powders offer the advantage of being capable of being premixed with cement in the form of ready-to-use pulverulent compositions that can be used, for example, for the manufacture of mortars and concretes intended to be attached to construction materials, for the manufacture of adhesive mortars or for the production of protective and decorative coatings inside or outside buildings.

It is customary to add relatively large quantities of inert substances and of protective colloids to powders, in order to succeed in obtaining powders that do not agglomerate during storage under the effect of pressure and temperature and that are conveniently redispersible in water.

To obtain readily redispersible polymer powders, it has been proposed to add to the dispersions, before the spraying, melamine-formaldehyde-sulphonate (U.S. Pat. No. 3,784,648) or naphthalene-formaldehyde-sulphonate (DE-A-3,143,070) condensation products and/or vinylpyrrolidone-vinyl acetate copolymers (EP-78,449).

French patent FR-A 2,245,723 is directed towards a stable and water-dispersible, freeze-dried preparation containing a powder of a polymer latex and a water-soluble dispersing agent which is a saccharide.

BRIEF SUMMARY OF THE INVENTION

The aim of the present invention is to propose a novel pulverulent composition which is completely or almost completely redispersible in water and which is based on a film-forming polymer prepared from monomers containing ethylenic unsaturation.

Another aim of the present invention is to propose a redispersible powder of the above type, which is stable on storage without agglomeration.

Another aim of the present invention is to propose a process for the preparation of the powders of the above type from a film-forming polymer latex.

Another aim of the present invention is to propose a redispersible powder of the above type which, in the form of powder or after possible redispersion in water in the form of a pseudolatex, can be used in any of the fields of application of latices for producing coatings (especially paints and paper-coating compositions) or adhesive compositions (especially pressure-sensitive adhesives and tiling adhesives).

Another aim of the present invention is to propose a redispersible powder of the above type (or the pseudolatex resulting therefrom) more particularly with a view to its use as additives to hydraulic binders of the mortar or concrete type and providing these binders with improved adhesion after immersion in a wet medium.

These and other aims are achieved by the present invention which relates, in fact, to a water-redispersible pulverulent composition containing:

a) 100 parts by weight of a powder of water-insoluble film-forming polymer prepared from at least one monomer containing ethylenic unsaturation and at least one monomer chosen from monomers with carboxylic functionality and acrylamide or methacrylamide, b) 2 to 40 parts by weight, preferably 8 to 22 parts by weight, of at least one amino acid or one of its salts.

The invention also relates to the process for preparing this pulverulent composition which consists in removing the water from an aqueous emulsion consisting of the said insoluble film-forming polymer prepared by emulsion polymerization and containing an appropriate amount of additives b)

and in spraying the dry residue into a powder with the desired particle size.

The invention also relates to the pseudolatex obtained by redispersing in water a pulverulent composition as defined above.

Finally, the invention relates to the use of the said pseudolatices and above pulverulent compositions as additives to hydraulic binders, adhesives, paper-coating compositions and paints.

DETAILED DESCRIPTION OF PREFERRED EMBODIMENTS

The invention relates firstly to a water-redispersible pulverulent composition containing:

a) 100 parts by weight of a powder of water-insoluble film-forming polymer prepared from at least one monomer containing ethylenic unsaturation and at least one monomer chosen from monomers with carboxylic functionality and acrylamide or methacrylamide, b) 2 to 40 parts by weight, preferably 8 to 22 parts by weight, of at least one amino acid or one of its salts.

The monomer containing ethylenic unsaturation may be chosen from: styrene, butadiene, acrylic or methacrylic esters of $C_1$–$C_{12}$ alkyl and their corresponding acids or the vinyl esters. The pulverulent composition according to the invention advantageously comprises an insoluble film-forming polymer prepared from a styrene/butadiene or styrene/butadiene/acrylic acid mixture as regards the monomers containing ethylenic unsaturation.

The monomers containing carboxylic functionality are chosen from carboxylic acids containing ethylenic unsaturation. Preferably, these are dicarboxylic acids containing ethylenic unsaturation such as: itaconic acid, fumaric acid, crotonic acid, maleic acid, maleic anhydride, mesaconic acid, glutaconic acid or mixtures thereof.

Preferably, the film-forming polymer is prepared by polymerization of a mixture of monomers containing 99.9 to 92% by weight of at least one monomer containing ethylenic unsaturation and 0.1 to 8%, advantageously 2 to 5%, by weight of at least one monomer containing carboxylic functionality. The size of the particles of film-forming polymer powder may be between 0.05 and 5 μm, preferably between 0.12 and 0.18 μm, even more preferably between 0.10 and 0.20 μm.

Preferably, the water-insoluble film-forming polymer has a glass transition temperature (Tg) of not more than 20° C., preferably of between −20° C. and 20° C.

The water-insoluble film-forming polymer may be obtained by emulsion polymerization of the monomers. Such a polymerization is usually carried out in the presence of an emulsifier and of a polymerization initiator.

The monomers may be introduced into the reaction medium as a mixture or separately and simultaneously, either before the start of polymerization in a single portion, or during the polymerization in successive fractions or continuously.

As regards the emulsifier, the conventional anionic agents are generally used, as represented especially by the salts of fatty acids, alkyl sulphates, alkyl sulphonates, alkylaryl sulphates, alkylaryl sulphonates, aryl sulphates, aryl sulphonates, sulphosuccinates, and alkyl phosphates of alkali metals. They are used in a proportion of from 0.01 to 5% by weight relative to the total weight of the monomers.

The emulsion polymerization initiator, which is water-soluble, is represented more particularly by hydroperoxides such as aqueous hydrogen peroxide, tert-butyl hydroperoxide and by persulphates such as sodium persulphate, potassium persulphate and ammonium persulphate. It is used in amounts of between 0.05 and 2% by weight relative to the total weight of the monomers. These initiators are optionally combined with a reducing agent such as sodium bisulphite or sodium formaldehyde sulphoxylate, polyethyleneamines, sugars such as dextrose or sucrose, or metal salts. The amounts of reducing agent used range from 0 to 3% by weight relative to the total weight of the monomers.

The reaction temperature, which is a function of the initiator used, is generally between 0 and 100° C. and preferably between 50 and 80° C.

A transfer agent may be used in proportions ranging from 0 to 3% by weight relative to the monomer(s) and generally chosen from mercaptans such as N-dodecyl mercaptan, tert-dodecyl mercaptan, tert-butyl mercaptan or their esters such as methyl mercaptopropionate; cyclohexene; and halogenated hydrocarbons such as chloroform, bromoform and carbon tetrachloride.

The pulverulent composition according to the invention also comprises at least one amino acid or one amino acid salt. The amino acid is preferably chosen from:
monocarboxylated monoamino acids,
or dicarboxylated monoamino acids,
or monocarboylated diamino acids.

The monocarboxylated monoamino acids may be chosen especially from glycine, alanine, leucine and phenylalanine, the dicarboxylated monoamino acids may be chosen from aspartic acid, glutamic acid and hydroxyglutamic acid, and the monocarboxylated diamino acids may be chosen from arginine, lysine, histidine and cystine.

The amino acids entering into the composition according to the invention are advantageously of good water-solubility; consequently, the amino acids of the composition may be in the form of salts and especially of water-soluble or aqueous-alkali-soluble salts. They may be, for example, sodium, potassium, ammonium or calcium salts.

The pulverulent compositions according to the invention may also comprise at least one water-soluble compound c) chosen from the polyelectrolytes belonging to the family of weak polyacids. More particularly, this compound is a solid.

According to a specific embodiment of the invention, this water-soluble compound is chosen from polyelectrolytes of organic nature derived from the polymerization of monomers which have the following general formula:

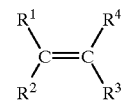

in which formula $R_i$, which are identical or different, represent H, $CH_3$, $CO_2H$, or $(CH_2)_nCO_2H$ with n=0 to 4.

By way of nonlimiting examples, acrylic, methacrylic, maleic, fumaric, itaconic and crotonic acids may be mentioned.

Copolymers obtained from monomers corresponding to the above general formula and those obtained with the aid of these monomers and other monomers, in particular vinyl derivatives such as vinyl alcohols and the copolymerizable amides such as acrylamide or methacrylamide are also suitable for the invention. Mention may also be made of the copolymers obtained from alkyl vinyl ether and from maleic acid as well as those obtained from vinylstyrene and from maleic acid and which are especially described in the Kirk-Othmer encyclopedia titled "Encyclopedia of Chemical Technology"—Volume 18—3rd edition, Wiley Interscience publication—1982. Peptide polymers derived from the polycondensation of amino acids, especially of aspartic and glutamic acids or of the precursors of diamino diacids, are also suitable for the invention. These polymers may be both homopolymers derived from aspartic or glutamic acid and copolymers derived from aspartic acid and from glutamic acid in any proportions, or copolymers derived from aspartic and/or glutamic acid and from other amino acids. Among the copolymerizable amino acids which may be mentioned are glycine, alanine, leucine, isoleucine, phenylalanine, methionine, histidine, proline, lysine, serine, threonine, cysteine and the like.

The preferred polyelectrolytes have a low degree of polymerization.

The weight-average molecular mass of the polyelectroytes is more particularly less than 20,000 g/mol. It is preferably between 1000 and 5000 g/mol.

Obviously, it is entirely possible to use these different types of water-soluble compounds in combination.

The composition according to the invention may comprise, in addition, a polymer chosen from polyacrylamides and polyvinylpyrrolidones or mixtures thereof. Preferably, the polyacrylamides used have a weight-average molecular mass of at most 10,000, or even of at most 2000.

The composition according to the invention may comprise from 5 to 20 parts by weight, preferably from 5 to 15 parts, even more preferably between 2 and 10 parts, of these water-soluble compounds per 100 parts by weight of film-forming polymer powder.

The composition according to the invention may also comprise an inorganic filler d) having a particle size of less than about 20 μm.

As inorganic filler, it is recommended to use a filler chosen in particular from silica, calcium carbonate, kaolin, barium sulphate, titanium oxide, talc, hydrated alumina, bentonite and calcium sulphoaluminate (white satin).

The presence of these inorganic fillers promotes the preparation of the powder and its stability on storage by preventing the powder from aggregating, that is to say caking.

This inorganic filler may be added directly to the pulverulent composition or it may be obtained from the process for preparing the composition. The amount of inorganic filler may be between 0.5 and 60, preferably from 10 to 20, parts by weight per 100 parts of water-insoluble film-forming polymer powder.

The pulverulent compositions obtained are stable on storage; they may readily be redispersed in water in the form of a pseudolatex and may be used directly in powder form or in pseudolatex form in all the fields of application known for latices. They are also of excellent fluidity.

The invention also relates to the process for preparing the said pulverulent composition, which consists:

in removing the water from an aqueous emulsion consisting of the said insoluble film-forming polymer prepared by emulsion polymerization and containing appropriate amounts of additives b) and optionally c) and d), and in spraying the dry residue into a powder with the desired particle size.

To begin with, an aqueous emulsion of the water-soluble film-forming polymer obtained by emulsion polymerization as defined above is used. This type of emulsion is commonly referred to as a latex.

The other components of the pulverulent composition: the amino acid or the amino acid salt (b), optionally the water-soluble compound (c) and the inorganic filler (d), are added to this aqueous emulsion. The respective contents of the various constituents are chosen such that the dried pulverulent compositions have the composition defined previously.

Preferably, an emulsion having a solids content (film-forming polymer+amino acid or amino acid salt+water-soluble compound+inorganic filler) of between 30 and 70% by weight is used to begin with.

Obviously, when conventional additives are used, they may be added during the formation of the emulsion.

An aqueous solution of about 30% by weight sodium hydrogen glutamate is added, for example, to the stirred latex. The respective amounts are calculated so as to obtain a mixture containing, on an active material basis, about 15 or 20% by weight sodium hydrogen glutamate and between 80 and 85% film-forming polymer.

The mixture obtained may, in this case, have a solids content of about 45% by weight, a pH of about 5 and a viscosity, measured on a Brookfield RVT-DVII machine at 50 rpm, of between 7 and 100 mpa·s.

The water of this emulsion is then removed and the product obtained is sprayed to obtain a powder. The steps for removing the water from the latex emulsion and for obtaining a powder may be separate or simultaneous. Thus, it is possible to use a freezing process, followed by a step of sublimation, or of freeze-drying, of drying or of drying by spraying (spray-drying).

Spray-drying is the preferred process since it allows the powder with the desired particle size to be obtained directly without necessarily passing via the grinding step. The particle size of the powder is generally less than 500 μm, preferably less than 100 μm, even more preferably greater than 50 μm.

The spray-drying may be carried out conventionally in any known apparatus such as, for example, a spraying tower combining spraying performed by a nozzle or a turbine with a stream of hot gas.

The inlet temperature of the hot gas (generally air), at the head of the column, is preferably between 120 and 70° C. and the outlet temperature is preferably between 50 and 70° C.

The inorganic filler d) may be added to the starting aqueous polymer emulsion. All or some of the inorganic filler may also be introduced during the spraying step into the spray-drying process. Lastly, it is possible to add the inorganic filler directly into the final pulverulent composition, for example in a rotary mixer.

According to a preferred mode, inorganic particles of small size, for example of about 3 μm, may be introduced into the spraying tower in an amount such that the pulverulent composition leaving the sprayer has a particle content of about 10% by weight; 20% by weight of particles of average size, for example of about 15 μm can then be added to this powder, the mixture being homogenized in a rotary mixer.

In most cases, the pulverulent compositions according to the invention are totally redispersible in water at room temperature by simple stirring. The term totally redispersible is understood to refer to a powder in accordance with the invention which, after addition of an appropriate amount of water, makes it possible to obtain a pseudolatex whose particle size is substantially identical to the particle size of the latex particles present in the starting emulsion. They are therefore of excellent wettability with water and of spontaneous, rapid and complete redispersion by redispersing this powder in deionized water or in $CaCl_2$ solution (1M). The particle size distribution of the pseudolatex obtained by redispersing this powder in water, determined with a Brookhaven DCP1000 photosedimentometer, is identical to that of the starting latex.

The invention also relates to the pseudolatex obtained by redispersing a pulverulent composition as defined above in water.

Lastly, the invention relates to the use of the pulverulent compositions described above in the construction industry as additives to mixtures of hydraulic inorganic binders for the preparation of protective and decorative coatings, adhesive mortars and adhesive cements intended for laying tile flooring and floor- coverings. They prove to be particularly suitable for the preparation of ready-to-use powder products based on cement and plaster.

When added to a cement mortar, the pulverulent composition according to the invention imparts to this mortar the same properties as those of the starting latex from which it is derived, namely an appreciable improvement in the adhesion to various supports irrespective of the conditioning of the mortar (drying, immersion in water, heating to 80° C.), flexural strength, adhesive strength and impact strength. It also allows a marked decrease in the water-uptake of adjuvant-containing mortar coatings.

The pulverulent compositions of the invention or the pseudolatices derived therefrom can also be used in all the other fields of application of latices, more particularly in the field of adhesives, paper coatings and paints. The pulverulent compositions according to the invention may also contain the usual additives, in particular biocides, microbiostats, bacteriostats and organic and silicone antifoaming agents.

EXAMPLES

Example 1

A latex obtained from the polymerization of styrene, butadiene, acrylic acid and a dicarboxylic acid containing ethylenic unsaturation is used. The polymer particle size, measured with a Brookhaven DCP 1000 photosedimentometer, is 0.17±0.1 μm.

This latex is introduced into a reactor equipped with a stirrer.

An aqueous 30% by weight sodium hydrogen glutamate solution is added to the stirred latex. The respective amounts are calculated so as to obtain a mixture containing, on an active material basis, 15% by weight sodium hydrogen glutamate and 85% film-forming polymer.

The mixture obtained has the following characteristics:

solids content: 45.5% by weight, pH: 5.5, viscosity measured with a Brookfield RVT-DVII machine at 50 rpm: 90 mPa·s.

This mixture is converted into powder by spray-drying. This drying is performed in a spraying tower in which the inlet temperature of the hot air is 105° C. and the outlet temperature is 60° C.

During the spraying, kaolin particles with an average size of 3 µm are introduced into the tower in an amount such that the pulverulent composition leaving the sprayer has a kaolin content of 10% by weight.

20% by weight calcium carbonate particles with an average size of 15 µm is added to this powder, the mixture being homogenized in a rotary mixer.

The powder obtained has the following characteristics:

average particle size: 80 µm, excellent fluidity, good stability on storage, excellent wettability with water, spontaneous, rapid and total redispersion both in deionized water and in concentrated $CaCl_2$ solution (1M).

The particle size distribution of the pseudolatex obtained by redispersing this powder in water, determined with a Brookhaven DCP1000 photosedimentometer, is identical to that of the starting latex.

When added to a cement mortar, the powder imparts to this mortar the same properties as those of the starting latex, namely an appreciable improvement in the adhesion to various supports irrespective of the conditioning of the mortar (drying, immersion in water, heating to 80° C.), flexural strength, adhesive strength and impact strength. It also allows a marked decrease in the water-uptake of the adjuvant-containing mortar coatings.

Example 2

A latex obtained from the polymerization of styrene, butadiene, acrylic acid and a dicarboxylic acid containing ethylenic unsaturation is used. The polymer particle size, measured with a Brookhaven DCP 1000 photosedimentometer, is 0.14±0.1 µm.

This latex is introduced into a reactor equipped with a stirrer.

An aqueous 30% by weight sodium hydrogen glutamate solution is added to the stirred latex. The respective amounts are calculated so as to obtain a mixture containing, on an active material basis, 20% by weight sodium hydrogen glutamate and 80% film-forming polymer.

The mixture obtained has the following characteristics:

solids content: 44.2% by weight, pH: 5.5, viscosity measured with a Brookfield RVT-DVII machine at 50 rpm: 70 mPa·s.

This mixture is converted into powder by spray-drying. This drying is performed in a spraying tower in which the inlet temperature of the hot air is 105° C. and the outlet temperature is 60° C.

During the spraying, kaolin particles with an average size of 3 µm are introduced into the tower in an amount such that the pulverulent composition leaving the sprayer has a kaolin content of 10% by weight.

20% by weight calcium carbonate particles with an average size of 15 µm is added to this powder, the mixture being homogenized in a rotary mixer.

The powder obtained has the following characteristics:

average particle size: 80 µm, excellent fluidity, good stability on storage, excellent wettability with water, spontaneous, rapid and total redispersion both in deionized water and in concentrated $CaCl_2$ solution (1M).

The particle size distribution of the pseudolatex obtained by redispersing this powder in water; determined with a Brookhaven DCP1000 photosedimentometer, is identical to that of the starting latex.

When added to a cement mortar, the powder imparts to this mortar the same properties as those of the starting latex, namely an appreciable improvement in the adhesion to various supports irrespective of the conditioning of the mortar (drying, immersion in water, heating to 80° C.), flexural strength, adhesive strength and impact strength. It also allows a marked decrease in the water-uptake of the adjuvant-containing mortar coatings.

Example 3

A latex obtained from the polymerization of styrene, butadiene, acrylic acid and a dicarboxylic acid containing ethylenic unsaturation is used. The polymer particle size, measured with a Brookhaven DCP 1000 photosedimentometer, is 0.17±0.1 µm.

This latex is introduced into a reactor equipped with a stirrer.

An aqueous 30% by weight solution of sodium hydrogen glutamate and solution of sodium polyacrylate with a molecular mass of 2000 is added to the stirred latex. The respective amounts are calculated so as to obtain a mixture containing, on an active material basis, 10% by weight sodium hydrogen glutamate, 10% sodium polyacrylate and 80% film-forming polymer.

The mixture obtained has the following characteristics:

solids content: 44.2% by weight, pH: 5.5, viscosity measured with a Brookfield RVT-DVII machine at 50 rpm: 100 mpa·s.

This mixture is converted into powder by spray-drying. This drying is performed in a spraying tower in which the inlet temperature of the hot air is 105° C. and the outlet temperature is 60° C.

During the spraying, kaolin particles with an average size of 3 µm are introduced into the tower in an amount such that the pulverulent composition leaving the sprayer has a kaolin content of 10% by weight.

20% by weight calcium carbonate particles with an average size of 15 µm is added to this powder, the mixture being homogenized in a rotary mixer.

The powder obtained has the following characteristics:

average particle size: 60 µm, excellent fluidity, good stability on storage, excellent wettability with water, spontaneous, rapid and total redispersion both in deionized water and in concentrated $CaCl_2$ solution (1M).

The particle size distribution of the pseudolatex obtained by redispersing this powder in water, determined with a Brookhaven DCP1000 photosedimentometer, is identical to that of the starting latex.

When added to a cement mortar, the powder imparts to this mortar the same properties as those of the starting latex, namely an appreciable improvement in the adhesion to various supports irrespective of the conditioning of the mortar (drying, immersion in water, heating to 80° C.), flexural strength, adhesive strength and impact strength. It also allows a marked decrease in the water-uptake of the adjuvant-containing mortar coatings.

Comparative Example 4

The latex of Example 1 is used. This latex is converted into powder by spray-drying. This spraying is performed in a spraying tower in which the inlet temperature of the hot air is 105° C. and the outlet temperature is 60° C.

During the spraying, kaolin particles with an average size of 3 µm are introduced into the tower in an amount such that the pulverulent composition leaving the sprayer has a kaolin content of 10% by weight.

20% by weight calcium carbonate particles with an average size of 15 µm is added to this powder, the mixture being homogenized in a rotary mixer.

The powder obtained has an average particle size of 80 µm.

When mixed with water, the powder does not redisperse. It retains an average particle size of about 80 µm. The non-redispersibility in water of this powder gives it poor properties in mortars, in contrast with the powders of the above examples.

What is claimed is:

1. A water-redispersible pulverulent composition comprising:
    a) a powder of water-insoluble film-forming polymer prepared from at least one monomer containing ethylenic unsaturation, at least one monomer with carboxylic functionality, and acrylamide or methacrylamide; and
    b) at least one amino acid or one of its salts.

2. A pulverulent composition according to claim 1, wherein the monomer containing ethylenic unsaturation is styrene, butadiene, acrylic or methacrylic esters of $C_1$–$C_{12}$ alkyl or their corresponding acids or vinyl esters.

3. A pulverulent composition according to claim 1, wherein the monomers with carboxylic functionality are carboxylic acids containing ethylenic unsaturation.

4. A pulverulent composition according to claim 3, wherein the monomers with carboxylic functionality are dicarboxylic acids containing ethylenic unsaturation.

5. A pulverulent composition according to claim 1, wherein the water-insoluble polymer is prepared from a mixture of monomers containing 99.9 to 92% by weight of at least one monomer containing ethylenic unsaturation and 0.1 to 8% by weight of at least one monomer with carboxylic functionality.

6. A pulverulent composition according to claim 1, wherein the amino acid is
    a monocarboxylated monoamino acid,
    a dicarboxylated monoamino acid, or
    a monocarboxylated diamino acid.

7. A pulverulent composition according to claim 1, wherein the amino acid is glycine, alanine, leucine, phenylalanine, aspartic acid, glutamic acid, hydroxyglutamic acid, arginine, lysine, histidine or cystine.

8. A pulverulent composition according to claim 1, wherein the amino acid salt is a water-soluble or aqueous-alkali-soluble salt.

9. A pulverulent composition according to claim 1, wherein the composition comprises at least one water-soluble compound (c) that is a weak polyacid polyelectrolyte.

10. A pulverulent composition according to claim 1, wherein the composition comprises a powdered inorganic filler (d) with a particle size of less than 20 µm.

11. A process for the preparation of a redispersible pulverulent composition as defined in claim 1, comprising:
    removing water from an aqueous emulsion comprising said insoluble film-forming polymer prepared by emulsion polymerization and additives (b) and optionally at least one water-soluble compound (c) and a powdered inorganic filler (d); and
    spraying the dry residue into a powder with the desired particle size.

12. A process according to claim 11, wherein the process includes spray-drying.

13. A process according to claim 11, wherein at least some of the inorganic filler (d) is added during said spraying.

14. A pseudolatex obtained by redispersing a pulverulant composition as defined in claim 1 in water.

15. A pulverulent composition according to claim 1, wherein the powder of water-insoluble film-forming polymer is present in an amount of 100 parts by weight, and the at least one amino acid or one of its salts is present in an amount of 2 to 40 parts by weight.

16. A pulverulent composition according to claim 15, wherein the at least one amino acid or one of its salts is present in an amount of 8 to 22 parts by weight.

17. A pulverulent composition according to claim 4, wherein the dicarboxylic acids containing ethylenic unsaturation are itaconic acid, fumaric acid, crotonic acid, maleic acid, maleic anhydride, mesaconic acid, glutaconic acid or mixtures thereof.

18. An additive comprising the pulverulent composition as defined in claim 1 and pseudolatex obtained by redispersing a pulverulent composition as defined in claim 1 in water.

19. A composition comprising a hydraulic binder, said hydraulic binder including an additive comprising the pulverulent composition as defined in claim 1 and pseudolatex obtained by redispersing a pulverulent composition as defined in claim 1 in water.

20. A composition comprising an adhesive, said adhesive including an additive comprising the pulverulent composition as defined in claim 1 and pseudolatex obtained by redispersing a pulverulent composition as defined in claim 1 in water.

21. A composition comprising a paper-coating composition, said paper-coating composition including an additive comprising the pulverulent composition as defined in claim 1 and pseudolatex obtained by redispersing a pulverulent composition as defined in claim 1 in water.

22. A composition comprising a paint, said paint including an additive comprising the pulverulent composition as defined in claim 1 and pseudolatex obtained by redispersing a pulverulent composition as defined in claim 1 in water.

* * * * *